US012190209B2

(12) United States Patent
Meng et al.

(10) Patent No.: US 12,190,209 B2
(45) Date of Patent: Jan. 7, 2025

(54) MACHINE-LEARNED MODELS INCORPORATING SEQUENCE ENCODERS THAT OPERATE ON BAG OF WORDS INPUT

(71) Applicant: Microsoft Technology Licensing, LLC, Redmond, WA (US)

(72) Inventors: Meng Meng, San Jose, CA (US); Daniel Sairom Krishnan Hewlett, Sunnyvale, CA (US); Sriram Vasudevan, Mountain View, CA (US); Vitaly Abdrashitov, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 905 days.

(21) Appl. No.: 17/313,560

(22) Filed: May 6, 2021

(65) Prior Publication Data

US 2022/0358398 A1 Nov. 10, 2022

(51) Int. Cl.
*G06N 20/00* (2019.01)
*G06F 16/951* (2019.01)
*G06F 16/955* (2019.01)
*G06F 18/2113* (2023.01)
*H04L 67/02* (2022.01)

(52) U.S. Cl.
CPC ........... *G06N 20/00* (2019.01); *G06F 16/951* (2019.01); *G06F 16/955* (2019.01); *G06F 18/2113* (2023.01); *H04L 67/02* (2013.01)

(58) Field of Classification Search
CPC ...... G06N 20/00; G06N 3/045; G06N 3/0895; G06N 3/09; G06F 16/951; G06F 16/955; G06F 18/2113; G06F 40/20; G06F 18/214; H04L 67/02
See application file for complete search history.

(56) References Cited

U.S. PATENT DOCUMENTS

2019/0034813 A1* 1/2019 Das .................. G06N 5/022
2020/0401661 A1* 12/2020 Kota ................. G06N 20/00

OTHER PUBLICATIONS

Vaswani, et al., "Attention Is All You Need", In Proceedings of the 31st Conference on Neural Information Processing Systems, Dec. 4, 2017, 11 Pages.

* cited by examiner

*Primary Examiner* — Pei Yong Weng
(74) *Attorney, Agent, or Firm* — NICHOLSON DE VOS WEBSTER & ELLIOTT LLP

(57) ABSTRACT

Techniques for incorporating sequence encoders into machine-learned models where the sequence encoders operate on bag of words (BOW) input are provided. Tokens that are associated with online activities of an entity are identified. Machine-learned embeddings that correspond to the tokens are identified. Based on one or more ordering criteria that are independent of the temporal occurrence of the online activities of the entity, an order of the machine-learned embeddings is determined. Based on the order, the machine-learned embeddings are inputted to a sequence encoder that generates output. Based on the output, a machine learned model that includes the sequence encoder generates a score. A content item is selected based on the score. The content item is transmitted over a computer network to a computing device.

17 Claims, 4 Drawing Sheets

MACHINE-LEARNED MODELS INCORPORATING SEQUENCE ENCODERS THAT OPERATE ON BAG OF WORDS INPUT

TECHNICAL FIELD

The present disclosure relates generally to machine learning and sequence encoders and, more specifically to, modifying input to sequence encoders of a machine-learned model.

BACKGROUND

A sequence encoder is a software program that encodes sequences of characters, such as text. Once a sequence of characters is encoded, the result may be used in any number of ways by downstream applications, such as generating text in another language (i.e., machine translation) or inputting the encoded text into a machine-learned model that generates scores for making predictions or decisions on what data to present, when to present data, and/or whether to present data.

A sequence encoder processes text, in the form of natural languages, with respect to its ordering. For example, "I work as a software engineer" is a normal sentence, but the permuted version "work software engineer as I" does not make sense. A set of words and/or phrases without any "ordering" is referred to as "Bag of Words" (BOW).

Many content platforms track user activities (e.g., page views, clicks, impressions, video presentations, scrolling) and store such activities in a BOW format, which means no temporal order of actions is preserved. Existing techniques treat user activities as non-sequential features (i.e., BOW) and only non-sequential encoders, such as deep averaging networks or mean/max pooling, have been applied to such activities. Attempts to leverage sequence encoders on BOW input have not been shown to increase the utility of machine learning deep neural networks.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for incorporating a sequence encoder into a machine-learned model are provided. The sequencer encoder operates on bag of words (BOW) data, which has no natural ordering. The BOW data comprises multiple individual input strings or tokens, each of which is mapped to an input embedding. In one technique, instead of using mean/max pooling to generate an "average" embedding given a set of embeddings to which a set of BOW data is mapped, the set of tokens is ordered based on non-temporal ordering criteria, such as numerically based on standardized identifiers (IDs). For example, each token in a set of tokens maps to a standardized ID and the corresponding set of standardized IDs is ordered by their respective standardized IDs. Then, each standardized ID is mapped to an input embedding that was previously learned by training a machine-learned model that incorporates the sequence encoder. The ordered input embeddings are input to the sequence encoder, which generates output that is input to other parts of the machine-learned model.

In a related technique, a set of embeddings in each training instance that is used to train a machine-learned model is ordered based on the same criteria as the ordering of input embeddings to the machine-learned model at model invocation or inference time.

Thus, embodiments involve applying sequence encoders to BOW data where no ordering information is preserved. In other words, BOW data is encoded using a sequence encoder. Machine-learned models that incorporate such sequence encoders that operate on BOW data experience significant and unexpected lift in their respective metrics in offline and online experiments. The metrics include accuracy, precision, recall, normalized discounted cumulative gain (NDCG), and AUC ROC.

System Overview

Figure 1:
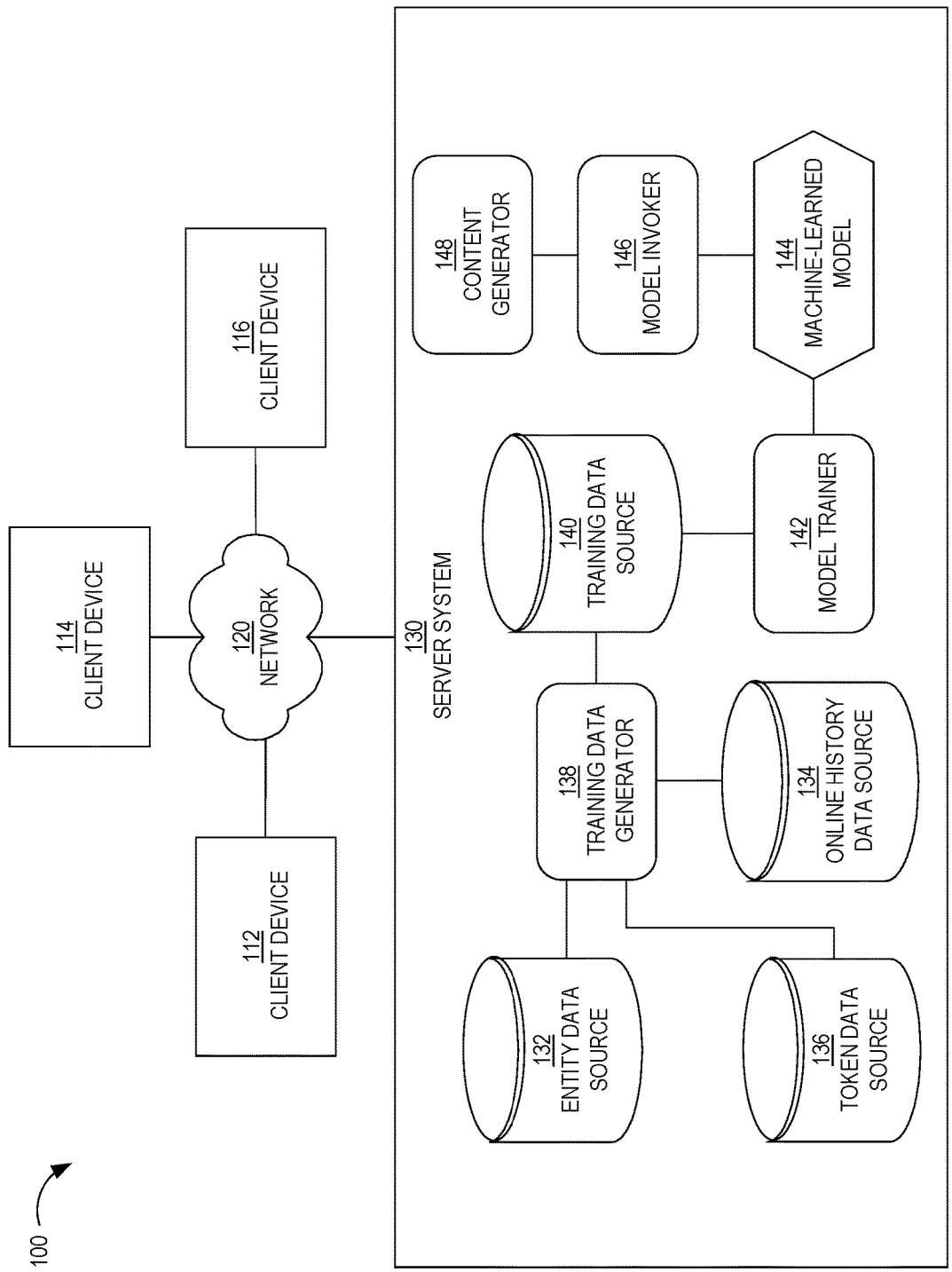
FIG. 1 is a block diagram that depicts an example system for encoding BOW data using a sequence encoder, in an embodiment.

FIG. 1 is a block diagram that depicts an example system 100 for encoding BOW data using a sequence encoder, in an embodiment. System 100 includes client devices 112-116, a network 120, and a server system 130. Although only three client devices are depicted, many client devices may be communicatively coupled to server system 130 through network 120 and/or other networks (not depicted). Server system 130 comprises one or more computing elements that perform the operations described herein as being performed by server system 130.

Network 120 is a computer network, examples of which include a local area network (LAN), a wide area network (WAN), and the Internet.

Examples of client devices 112-116 include a desktop computer, a laptop computer, a tablet computer, a wearable device, a video game console, and a smartphone.

A client device may receive content from server system 130 in response to transmitting a content request over network 120 to server system 130. Examples of a content request include a search request and a page request. A search request includes one or more query terms that are entered through the client device, such as through a physical keyboard of the client device or a graphical keyboard that is presented on a touchscreen display of the client device. A page request includes a uniform resource locator (URL) of a resource (e.g., web page) that server system 130 hosts.

A client application executing on the client device transmits the content request to server system 130. Examples of such a client application include (1) a web application that executes within a web browser that executes on the client device and (2) a native application that is installed on the client device and is configured to communicate with server system 130.

A client device may receive content from server system 130 not in response to a content request from the client device. For example, server system 130 identifies content that server system 130 determines is relevant to a user of the client device and sends, to the client device or to an account of the user, a notification of the content in the form of an instant message, a text message, an email message, a push notification, or an in-app notification. Later, the user, operating the client device or another device, views the notification and determines whether to select any links to content found in the notification, the links referencing content hosted by server system 130 and/or another computer system.

Server System

Server system 130 includes an entity data source 132, an online history data source 134, a token data source 136, a training data generator 138, a training data source 140, a model trainer 142, a machine-learned model 144, a model invoker 146, and a content generator 148.

Each of components 138, 142, 146, and 148 is implemented in software, hardware, or a combination of software and hardware. The functionality of components 138, 142, 146, and 148 may be implemented in a single program or in across multiple programs in order to adhere to component-based software engineering.

Components 138, 142, 146, and 148 may be implemented on the same computing device or on multiple computing devices. For example, each of components 138, 142, 146, and 148 may be implemented on different computing devices that are communicatively coupled to each other over a computer network, such as a local area network (LAN), wide area network (WAN), or the Internet.

Entity Data Source

Entity data source 132 stores multiple entity profiles. Each entity profile in entity data source 132 is provided by a different user. Example entities for which profiles are maintained include users, groups of users, and organizations (e.g., companies, associations, government agencies, etc.). Each entity profile is provided by a different user or group/organization representative.

An organization profile may include an organization name, a website, one or more phone numbers, one or more email addresses, one or more mailing addresses, a company size, a logo, one or more photos or images of the organization, an organization size, and a description of the history and/or mission of the organization.

A user profile may include a first name, last name, an email address, residence information, a mailing address, a phone number, one or more educational/academic institutions attended, one or more academic degrees earned, one or more current and/or previous employers, one or more current and/or previous job titles, a list of skills, a list of endorsements, and/or names or identities of friends, contacts, connections of the user, and derived data that is based on actions that the candidate has taken. Examples of such actions include jobs to which the user has applied, views of job postings, views of company pages, private messages between the user and other users in the user's social network, and public messages that the user posted and that are visible to users outside of the user's social network (but that are registered users/members of the social network provider). As described in more detail herein, information about such actions may be stored separately, such as in online history data source 134.

Some data within a user's profile (e.g., work history) may be provided by the user while other data within the user's profile (e.g., skills and endorsement) may be provided by a third party, such as a "friend," connection, or colleague of the user.

Server system 130 may prompt users to provide profile information in one of a number of ways. For example, server system 130 may have provided a web page with a text field for one or more of the above-referenced types of information. In response to receiving profile information from a user's device, server system 130 stores the information in an account that is associated with the user and that is associated with credential data that is used to authenticate the user to server system 130 when the user attempts to log into server system 130 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, server system 130 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by server system 130 (or another computing system). For example, a user specifies, in his/her profile, a name of the user's employer. Server system 130 determines, based on the name, where the employer and/or user is located. If the employer has multiple offices, then a location of the user may be inferred based on an IP address associated with the user when the user registered with a social network service (e.g., provided by server system 130) and/or when the user last logged onto the social network service.

Embodiments are not limited to the type of data that server system 130 stores or the type of requests that client devices 112-116 might submit. For example, another data source included in server system 130 may include information about multiple content delivery campaigns, where each campaign is associated with a single party or entity that provides the campaign (or "campaign provider"). An example of such content is an advertisement and an example of a campaign provider is an advertiser. An individual representing a campaign provider and operating client device 112 may submit one or more requests for information about content delivery campaigns that are being managed by server system 130, such as how the content delivery campaigns are performing, which ones are still active.

Another example of a data source included in server system 130 is an opportunity data source that stores information about multiple opportunities, such as job postings. Information about an opportunity includes a name of a provider of the opportunity (e.g., a company name), an industry name, a job title, a job description, a set of skills required to be accepted for the opportunity, a location of where the job is to be performed, and an assessment (e.g., a set of questions) to complete in order to apply for the opportunity.

Online History Data Source

Online history data source 134 stores information about the online history of each user of multiple users. The online history may comprise search history (e.g., key words entered into a search field), search result history (e.g., sets of search results that were presented to the user in response to searches initiated by the user), page view history (e.g., which pages the user viewed or was presented), notification history (e.g., a set of notifications presented to the user, whether push notifications or in-app notifications), recommendation history (e.g., a set of recommendations that were presented to the user), and/or user interaction history (e.g., identification of links, video items, non-video content items, search results, notifications, recommendations, job postings, and/or graphical options that the user selected).

Information about each action performed by a user or performed by server system 130 relative to a user may be stored in a record that uniquely identifies the user (e.g., using a user identifier). A record may also include a timestamp that indicates a date and/or time of the corresponding action. For search history, a record includes the one or more search terms that a user entered or selected. For search result history, a record may include (a) a list of entities (e.g., company names, job postings) that were presented to the user in a search result list and, optionally, (b) the search criteria that was used to identify the entities in the list. For page view history, a record may include a page identifier of a web page that was presented to the user or that the user requested.

For notification history, a record may include a notification type (e.g., work anniversary, a new job of a friend/connection, a new role/position of a friend/connection, a posting from a connection or followed entity, an upcoming event), an entity name that is identified in the notification that was presented, and other content in the notification.

For recommendation history, a record may include a recommendation type (e.g., a recommended job, a recommended online learning course, a recommended new friend/connection, a recommended person or company to follow), an entity (e.g., person or company) name that is the subject of the recommendation, and other content in the recommendation. For user interaction history, a record may include a type of interaction (e.g., click, view for less than two seconds, view for more than two seconds, highlight, option selection), a type of object with which interacted (e.g., link, notification, recommendation, video item, search result, search option), text associated with the interaction, and name of entity (e.g., company name or person name) that is the subject of the interaction.

In an embodiment, records in online history data source 134 are aggregated to produce aggregated data on a per user-basis. For example, records pertaining to user A are organized so that they are logically (or physically) stored together, thus, enabling faster access when information about user A is required. In this way, the entirety of online history data source 134 does not need to be searched to find records pertaining to a particular user when information about that particular user is requested. The aggregated data may be stored separate from online history data source 134 and used for further processing, as described herein.

Additionally or alternatively to record aggregation, an index based on user identifier may be generated to enable fast retrieval of records in online history data source 134 pertaining to each user. However, when new records are added to online history data source 134, the index needs to be updated to account for the new records, unless maintaining a stale index is accessible.

Token Data Source

Token data source 136 stores information about tokens that are associated with users or organization. Examples of categories of tokens that are associated with users or organizations include attributes of users and organizations, such as job title, skills, employer name, geographic location, etc. Examples of tokens pertaining to the category of job title include Software Engineer, Attorney, Financial Consultant, Electrical Engineer, Marketing Coordinator, Medical Assistant, Web Designer, Dog Trainer, Account Executive, and Librarian. Examples of tokens pertaining to the skill category include Consulting, Data Analysis, Problem Solving, Editing, UI/UX, Negotiation, Public Relations, and Cloud Computing. As these example tokens illustrate, a token may comprise multiple words that are delineated by whitespace.

In an embodiment, each token listed in token data source 136 is associated with a standardized identifier (ID). For example, Software Engineer may have a standardized ID of 34267, while Attorney may have a standardized ID of 83. A standardized ID may have a category or type encoded in the identifier itself. For example, a standardized ID for a particular job title may be JT_83 while a standardized ID for a particular skill may be S_83, even though the particular job title and the particular skill may be completely unrelated to each other.

In another embodiment, standardized IDs are stored with their corresponding tokens that are found in entity data source 132 and online history data source 134. In this way, an extra lookup to token data source 136 is not necessary in order to identify a standardized ID given a token.

Machine Learning

Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with users and regions. The statistical model is trained based on multiple attributes (or factors) described herein. In machine learning parlance, such attributes are referred to as "features." To generate and train a statistical model, a set of features is specified and a set of training data is identified.

Embodiments are not limited to any particular machine learning technique for generating or training a model. Example machine learning techniques include linear regression, logistic regression, random forests, naive Bayes, neural networks, and Support Vector Machines (SVMs). Advantages that machine-learned models have over rule-based models include the ability of machine-learned models to output a probability (as opposed to a number that might not be translatable to a probability), the ability of machine-learned models to capture non-linear correlations between features, and the reduction in bias in determining weights for different features.

Embodiments are applicable to both supervised learning and self-supervised learning. Supervised learning is the machine learning task of learning a function that maps an input to an output based on example input-output pairs. A supervised learning algorithm analyzes the training data and produces an inferred function, which can be used for mapping new examples. Two types of supervised learning include classification (which involves predicting a class label) and regression, which involves predicting a numerical value. A self-supervised learning is a type of algorithm that learns patterns from untagged (or unlabeled) data. BERT and GPT3 are examples of self-supervised models.

Training Data Generator

Training data generator 138 generates training data for training machine-learned model 144. Training data comprises multiple training instances, each including a set of feature values and a label. Training data generator 138 accepts a definition of machine-learned model 144, the definition defining features of machine-learned model 144. Some features may be raw features whose values may be retrieved from storage, such as profile attributes and online activity. Some features may be derived features whose values are derived (or computed) based on one or more raw features and/or derived features. For example, a derived feature is a list of job titles of job postings that a user viewed in the last week. In order to compute a value for this derived feature, training data generator 138 analyzes online history data source 134 to identify records that identify a particular user and that identify a job posting that the user viewed. The records may include the job titles or may include references to other records that include the job titles. Training data generator 138 generates a list of job titles (or a list of standardized job title IDs) based on the retrieved records and includes the list in a training instance along with other feature values and a label, as defined in the model definition.

Example features of machine-learned model 144 include user features, organization features, interaction features, and contextual features. User features may include features corresponding to attributes of a user and features corresponding to online activities of the user. Organization features may include features corresponding to attributes of an organization and features corresponding to aggregates of user attributes that are associated with the organization, such as employees of the organization, customers of the organization, and/or users who have visited pages associated with the organization. Interaction features include features about interactions between two entities (e.g., a user and an organization). For example, an interaction feature may be a number of times a user selected a content item that was provided by an organization in the last month. Contextual features may include features about a time of day, a day of the week, a type of computing device that the user operates, and attributes and/or identifies of entities on a page that the user is viewing.

Examples of labels include whether a user selected a content item associated with an organization, whether a user watched at least three seconds of a video provided by an organization, whether a user filled out a web form that was presented to the user and that was provided by an organization, whether a user purchased a product sold by an organization, whether a user selected a notification about another user, whether a user responded to an electronic message from an organization, and whether a user accepted an invitation to connect with another user.

In order to generate the training data, information about each, for example, user-organization pair (or user-job posting pair) is analyzed to compute the different feature values. In this example, the label of each training instance may be whether the user interacted with a content item from the content delivery campaign (in the case of user-campaign pairs) or whether the user interacted with the job posting (in the case of user-job posting pairs).

Model Trainer and the Machine-Learned Model

Model trainer 142 implements one or more machine learning techniques to train machine-learned model 144 based on training data from training data source 140. Machine-learned model 144 may be a classification model or a regression model.

Initially, the number of features that are considered for training may be significant. After training a machine-learned model and validating the model, it may be determined that a subset of the features have little correlation or impact on the final output. In other words, such features have low predictive power. Thus, machine-learned weights for such features may be relatively small, such as 0.01 or −0.001. In contrast, weights of features that have significant predictive power may have an absolute value of 0.2 or higher. Features with little predictive power may be removed from the training data. Removing such features can speed up the process of training future models and computing output scores.

Machine-learned model 144 comprises one or more sequence encoders. Machine-learned model 144 comprises other elements, such as a deep portion and/or a wide portion, "deep portion" referring one or more neural networks and "wide portion" referring to a set of coefficients that have been learned for a corresponding set of features. For example, the output of the one or more sequence encoders may be input to a deep portion of the machine-learned model 144.

Sequence Encoder

A sequence encoder encodes an input sequence of tokens (usually a sentence), resulting in output that is input to another portion of machine-learned model 144. A sequence encoder includes weights or coefficients that are learned while training machine-learned model 144 mbased on training data from training data source 140.

Inputs to a sequence encoder are embeddings that have been machine-learned for tokens or standardized IDs thereof. For example, an token is used to lookup a corresponding standardized ID, which is then used to lookup a corresponding embedding that has been machine-learned for that standardized ID. An embedding is a vector of values, such as a vector of real numbers. Traditionally, each word in a sentence (e.g., "and") is mapped to a different embedding. In contrast, a single token in embodiments herein may comprise multiple words (e.g., "Lead Software Engineer"), which maps to a single embedding.

The output of a sequence encoder that accepts a set of embeddings as input may be the same size as an individual input embedding. For example, an input embedding to a sequence encoder consists of 64 floating point values and the output produced by the sequence encoder is also an embedding consisting of 64 floating point values.

In an embodiment, each sequence encoder is associated with a listing (or matrix) of token-embedding pairs. The value of each token remains constant during the training phase and during invocation of machine-learned model 144. Examples of tokens include numerical standardized IDs and human-readable tokens. The values of the embeddings in the listing, however, are modified during the training phase to minimize a measure of error in machine-learned model 144. Prior to the training phase, the values of the embeddings may be randomly initialized or may be preset to values that were previously machine-learned.

In an embodiment, machine-learned model 144 comprises multiple sequence encoders, each corresponding to a different category of input data. For example, a first sequence encoder is for job titles of job postings that a user has searched, a second sequence encoder is for skills listed in those job postings, and a third sequence encoder is for names of companies that are listed in those job postings and of companies that the user has searched individually.

Transformer

Examples of sequence encoders include recurrent neural networks (RNNs) and transformers. A transformer is a deep learning model that utilizes the mechanism of attention, weighing the influence of different parts of an input sequence of tokens or data items. A transformer is used primarily in the field of natural language processing (NLP), but recent research has also developed its application in other tasks like video understanding. Like RNNs, transformers are designed to handle sequential data, such as natural language, for tasks such as translation and text summarization. However, unlike RNNs, transformers do not require that the sequential data be processed in order. For example, if the input data is a natural language sentence, then the transformer does not need to process the beginning of the input data before the end of the input data. Due to this feature, the transformer allows for much more parallelization than RNNs and, therefore, reduced training times.

RNNs process tokens sequentially, maintaining a state vector that contains a representation of the data seen after every token. To process the nth token, the model combines the state representing the sequence up to token n−1 with the information of the new token to create a new state, representing the sequence up to token n. Theoretically, the information from one token can propagate arbitrarily far down the sequence, if at every point the state continues to encode information about the token. But, in practice, this mechanism is imperfect. Due in part to the vanishing gradient problem, the model's state at the end of a long sentence often does not contain precise, extractable information about preceding tokens.

This problem is addressed by the introduction of attention mechanisms. Attention mechanisms let a model directly look at, and draw from, the state at any preceding point along an input sequence of tokens. The attention layer can access all previous states and weighs them according to some learned measure of relevancy to the current token, providing sharper information about far-away relevant tokens. A clear example of the utility of attention is in translation. In an English-to-French translation system, the first word of the French output most probably depends heavily on the beginning of the English input. However, in a classic encoder-decoder LSTM model, in order to produce the first word of the French output the model is only given the state vector of the last English word. Theoretically, this vector can encode information about the whole English sentence, giving the model all necessary knowledge, but in practice this information is often not well preserved. If an attention mechanism is introduced, then the model can instead learn to attend to the states of early English tokens when producing the beginning of the French output, giving it a much better concept of what it is translating.

When added to RNNs, attention mechanisms have led to large gains in performance. The introduction of the transformer illustrated that attention mechanisms were powerful in themselves and that sequential recurrent processing of data was not necessary for achieving the performance gains of RNNs with attention. The transformer uses an attention mechanism without being an RNN by processing all tokens at the same time and calculating attention weights between the tokens. Because transformers do not rely on sequential processing, transformers naturally lend themselves to parallelization, which allows transformers to be trained more efficiently on larger datasets.

Figure 2:
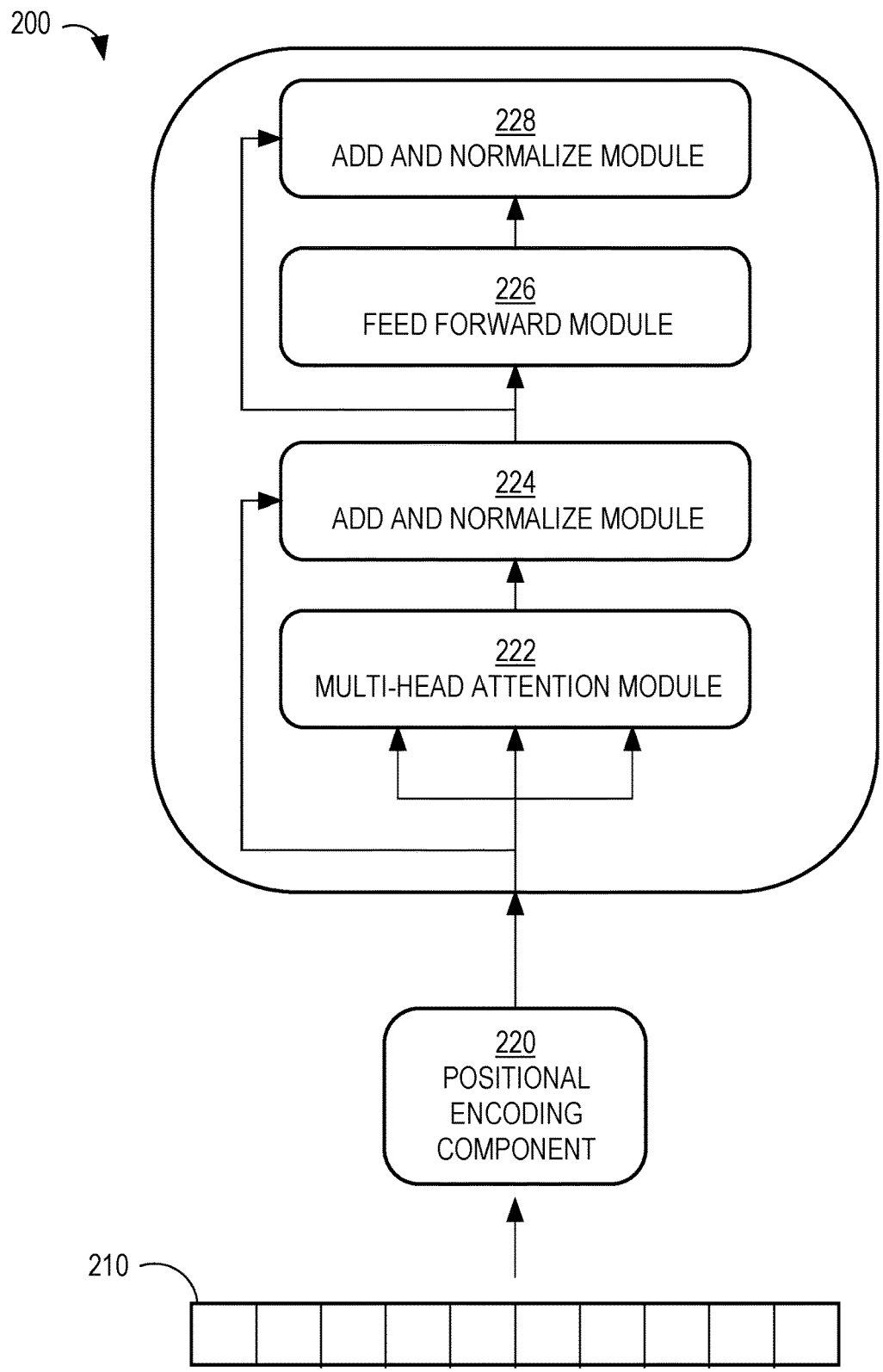
FIG. 2 is a block diagram that depicts an example transformer, in an embodiment.

FIG. 2 is a block diagram that depicts an example transformer 200, in an embodiment. For purposes of illustration, FIG. 2 only depicts a single embedding 210. However, in order to generate a single score for an entity, transformer 200 may process multiple embeddings simultaneously. Before transformer 200 accepts embedding 210 as input, a positional encoding component 220 encodes a sequence position value that indicates a relative position of embedding 210 among a set of embeddings. For example, if the embedding is the second embedding in a set of embeddings, then positional encoding component 220 assigns or adds '2' to the embedding. (Other types of sequence encoders do not encode a position value.) Modules within transformer 200 process the sequence position value in conjunction with embedding 210.

Transformer 200 includes a multi-head attention module 222 and a feed forward module 226, each of which comprises machine-learned weights that were learned during a training phase of machine-learned model 144 and that are applied to embeddings that are input to the respective module. Multi-head attention module 222 comprises multiple attention heads, or layers, that run in parallel. In each attention head, for each input embedding, three vectors are created, referred to as a Query vector, a Key vector, and a Value vector. These vectors are created by multiplying an input embedding by three matrices (Q, K, and V) that were trained during the training process. A score is generated for each set of three vectors (corresponding to an input embedding) by taking the dot product of the query vector with the key vector of the respective token that is being scored. The generated scores are divided by the square root of the dimension of the key vectors, which result is passed through a softmax operation. Each value vector is multiplied by the softmax result, resulting in weighted value vectors. The weighted value vectors are summed to generate an output of the corresponding attention head. The output of each attention head is concatenated and input to a linear transformation operation, whose output is the output of multi-head attention module 222.

Feed forward module 226 comprises an artificial neural network (ANN) where connections between nodes in the ANN do not form a cycle. Information moves in only one direction, i.e., forward, from input nodes, through hidden nodes (if any), to output nodes.

Transformer 200 divides embedding 210 into multiple portions and multi-head attention module 222 processes different portions of embedding 210. Transformer 200 also includes an add and normalize module 224 that operates on embedding 210 and the output of multi-head attention module 222 to produce input for feed forward module 226. Transformer 200 also includes an add and normalize module 228 that operates on the output of feed forward module 226 to produce an output embedding that may be input to other elements of machine-learned model 144.

Model Invoker

Model invoker 146 invokes machine-learned model 144 in response to a request from another component of server system 130, such as content generator 148. A request to model invoker 146 may include one or more entity identifiers, such as a user identifier for which a recommendation or a notification is to be generated based on output from machine-learned model 144, a job posting identifier that identifies a job posting that may be the subject of a recommendation to the user, an organization identifier that identifies an organization that may be of interest to the user, a video item identifier that identifies a video item that may be of interest to the user, and/or an article identifier that identifies an online article that may be of interest to the user.

Model invoker 146 uses the received entity identifier(s) to obtain feature values for machine-learned model 144. Such obtaining may involve retrieving, based on an entity identifier, data from entity data source 132, retrieving, based on the entity identifier, data from online history data source 134, and, optionally, generating some of the feature values from the retrieved data. Generating a feature value may involve aggregating multiple data items from the retrieved information, such as generating a list of job titles from different search history records.

Content Generator

Content generator 148 generates content to transmit to client devices 112-116 over network 120. Although only one content generator is depicted, server system 130 may include multiple content generators. For example, one content generator may generate recommendations, another content generator may generate notifications, another content generator may generate search results, and another content generator may generate web pages.

In an embodiment, content generator 148 calls, or sends a request to, model invoker 146. Content generator 148 (or another component of server system 130) generates content for presentation on a computing device based on one or more scores output by machine-learned model 144.

Ordering Input Embeddings Corresponding to Bow Data

In an embodiment, a set of input embeddings corresponding to BOW data is ordered based on one or more ordering criteria prior to inputting the set of embeddings to a sequence encoder of a machine-learned model 144. Model invoker 146 is an example component of server system 130 that may apply the one or more ordering criteria. Examples of ordering criteria include ordering alphanumerically based on standardized ID (or just numerically if standardized IDs consist only of numbers) and ordering alphabetically based on tokens if tokens consist only of alphabetic characters. As long as the ordering is fixed and unchanging, then any ordering criteria that is independent of the temporal occurrence of the online activity that triggered the association of the token with the entity may be used. Thus, in two different instances involving the same set of BOW tokens, when the one or more ordering criteria are applied, the set of BOW tokens (or their corresponding embeddings) will have the same order. Thus, the ordering criteria is not based on end-user behavior, such as when the tokens were searched or selected. (If that was the case, then two sets of identical BOW tokens could have different orderings.

In contrast, when processing BOW data using prior approaches, embeddings corresponding to different tokens in the BOW data were combined using a simple operation, such as max pooling or mean pooling.

Using fixed ordering criteria to order embeddings corresponding to BOW data helps the sequence encoder to learn a pattern of user activity reflected in the BOW data by aligning the respective data distributions associated with online activities of different users. For example, if two users separately searched job titles A, B, and C, but one of the searches is recorded as {A, B, C} and the other search is record as {B, C, A}, then training a machine-learned model based on the different ordering of these searches will make it difficult for the machine-learned model to learn that these are the same searches. The same rationale for ordering applies even if the two sets of BOW data are not exactly the same but have overlap, such as one set of BOW data being A, B, C and another set of BOW data being A, C, D, E.

The order of a set of input embeddings dictates an order in which the set of input embeddings are inputted into the sequence encoder. For transformers, the order of a set of input embeddings also indicates a sequence value that will be associated with each input embedding as the input embedding is processed by the sequence encoder. The sequence value indicates a relative position of the input embedding in the ordered set of input embeddings. For example, the first input embedding in an ordered set of embeddings is assigned a value of 1, the second input embedding in the ordered set is assigned a value of 2, and so forth. The sequence value is inputted (with the input embedding) to the sequence encoder to indicate the embedding's relative position among the other embeddings in the ordered set.

For example, a feature of machine-learned model 144 is a set of job titles of job postings that a user has searched in the last week. Online history data source 134 is searched to identify an online search history of the user for the last week. A set of records that identify the user and that correspond to a different job posting that the user selected is identified as a result of the search. A job title (an example of an token) listed in each job title is extracted from each record or is retrieved by following a reference in each record. Once the set of job titles is identified, token data source 136 is searched to identify a standardized ID for each job title in the set of job titles. Once a set of standardized IDs that corresponds to the set of job titles is identified, the set of standardized IDs is ordered numerically from smallest to largest (or vice versa) to generate an ordered set of standardized IDs. For each ID in the ordered set of standardized IDs, an embedding in the list of standardized ID-embedding pairs is retrieved and a sequence value is assigned to the embedding. The embedding-sequence value pairs are input to a sequence encoder that has been trained based on past embedding-sequence value pairs corresponding to job titles.

As another example, a feature of machine-learned model 144 is a set of company names that a user has searched in the last month. Online history data source 134 is searched to identify an online search history of the user for the last month. A set of records that identify the user and that correspond to a different company that the user searched by name is identified as a result of the search of data source 134. A company name (an example of an token) is extracted from each record or is retrieved by following a reference in each record. Once the set of company names is identified, token data source 136 is searched to identify a standardized ID for each company name in the set of company names. Once a set of standardized IDs that corresponds to the set of company names is identified, the set of standardized IDs is ordered numerically from smallest to largest (or vice versa) to generate an ordered set of standardized IDs. For each ID in the ordered set of standardized IDs, an embedding in the list of standardized ID-embedding pairs is retrieved and a sequence value is assigned to the embedding. The embedding-sequence value pairs are input to a sequence encoder that has been trained based on past embedding-sequence value pairs corresponding to company names.

Consistently Ordering Input Embeddings

In an embodiment, the one or more ordering criteria used to order input embeddings during the training phase are the same ordering criteria used to order input embeddings during the model invocation (or model inference) phase. For example, if input embeddings are ordered numerically based on their respective standardized IDs prior to being input to a sequence encoder during training of machine-learned model 144 that includes the sequence encoder, then input embeddings are similarly ordered numerically based on their respective standardized IDs prior to being input to the sequence encoder during inference time.

Process Overview

Figure 3:
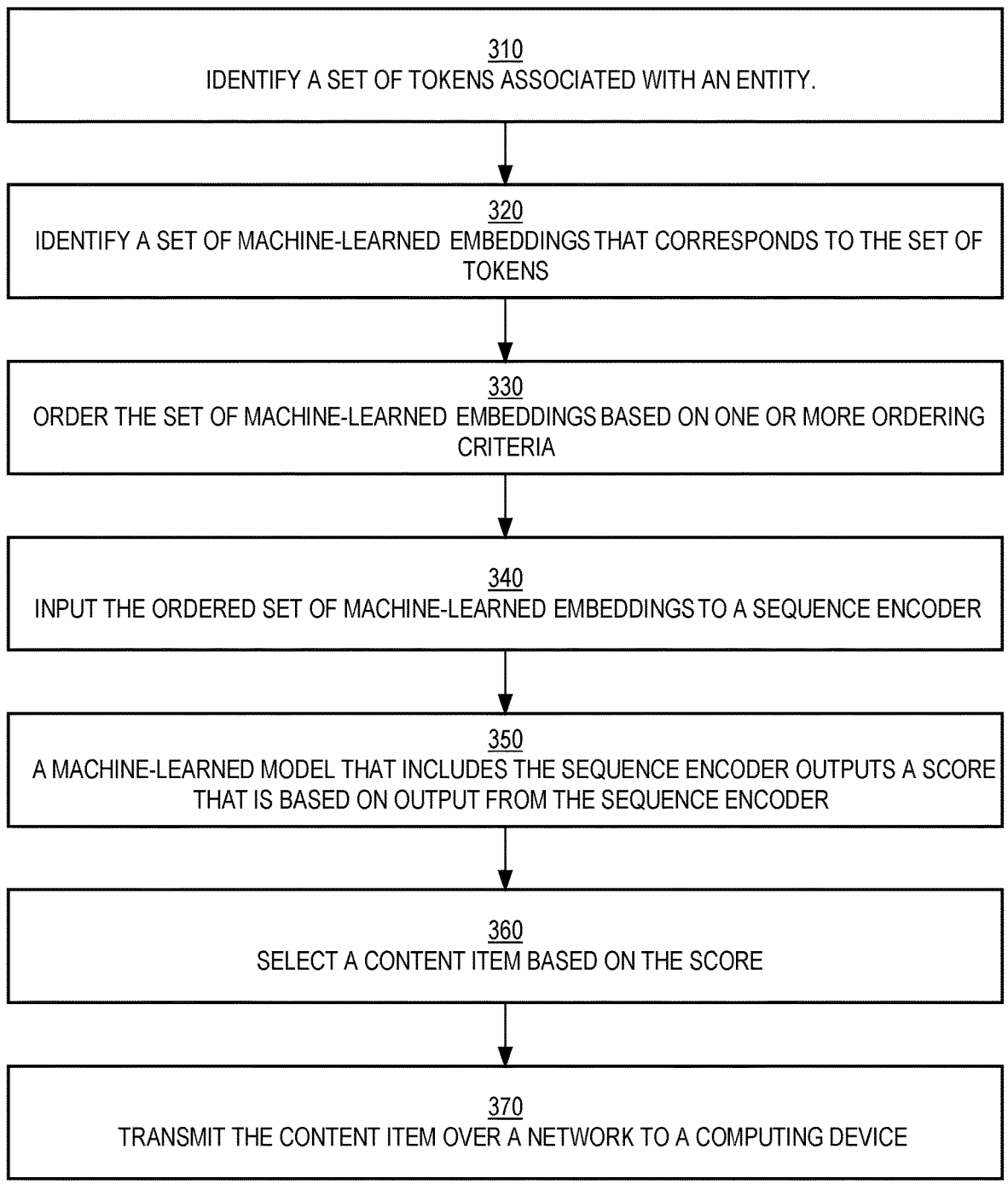
FIG. 3 is a flow diagram that depicts an example process for encoding BOW data using a sequence encoder, in an embodiment.

FIG. 3 is a flow diagram that depicts an example process 300 for encoding BOW data using a sequence encoder, in an embodiment. Process 300 is performed using different components of server system 130. For example, blocks 310-340 may be performed by model invoker 146. Process 300 may be initiated (a) automatically in a periodic manner, (b) based on a request from a client device (e.g., client device 112), or (c) based on the occurrence of one or more events.

At block 310, a set of tokens that is associated with online activities of an entity is identified. The entity may be a user, an organization, or another type of entity. The tokens may be of one of multiple categories, such as job title, company name, or skill. For example, one token may be one specific job title (e.g., Assistant Clerk) while another token may be another specific job title (e.g., Corporate Attorney). The tokens are not part of a sentence and, therefore, have no inherent ordering.

At block 320, a set of machine-learned embeddings corresponding to the set of tokens is identified. Block 320 may involve using each token to look up an embedding in a mapping of tokens to embeddings. Alternatively, block 320 may involve using each token to look up a standardized ID in a mapping of tokens to standardized IDs and then use the standardized ID to look up an embedding in a mapping of standardized IDs to embeddings.

At block 330, the set of machine-learned embeddings is ordered based on one or more ordering criteria. For example, the set of machine-learned embeddings is ordered numerically based on standardized IDs that correspond to the set of tokens. Alternatively, the set of machine-learned embeddings is ordered alphabetically based on the set of tokens. The one or more ordering criteria is independent of when the corresponding online activities of the entity occurred.

At block 340, the ordered set of machine-learned embeddings is input to a sequence encoder based on the order. If the sequence encoder is a transformer, then block 340 may involve adding, or encoding, to each machine-learned embedding, a sequence position value that indicates a position of the embedding relative to other embeddings in the ordered set.

At block 350, a machine-learned model that includes the sequence encoder generates a score based on (1) output from the sequence encoder and (b) one or more other feature values of the machine-learned model. Block 350 may involve generating a score for each of multiple items relative to the entity. For example, one hundred candidate job postings are scored for relevance relative to a user.

At block 360, a content item is selected based on the score. Given the example above where multiple scores are generated, the top five candidate job postings with the highest scores are selected. In this example, the content item is a job recommendation that includes information about a job posting.

At block 370, the selected content item is transmitted over a computer network to a computing device. For example, server system 130 transmits a job recommendation over network 120 to client device 112. The content item may be included in an email, a push notification, an in-app notification, or a webpage that is presented on the computing device. The computing device may be operated by the entity, with which the set of tokens is associated.

Cross-Category Sequence Encoder

In an embodiment, a set of input embeddings corresponding to tokens of different categories are input into the same sequence encoder. For example, a first set of tokens pertaining to job titles that the particular user has searched and a second set of tokens pertaining to company names that the particular user has searched are identified and input embeddings that correspond to those sets of tokens are identified and input into the sequence encoder. The output of the sequence encoder based on these different sets of embeddings is input to another portion of machine-learned model 144, which generates a score for the particular user relative to a particular job posting or a particular organization that is hiring.

In a related embodiment, each set of tokens (corresponding to a different category) is ordered based on ordering criteria and the sets of tokens are ordered based on a pre-determined ordering. For example, input embeddings corresponding to category A are ordered before input embeddings corresponding to category B. Thus, any input embeddings corresponding to category A are input to a sequence encoder prior to input embeddings corresponding to category B. Again, such ordering may be performed by model invoker 146.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
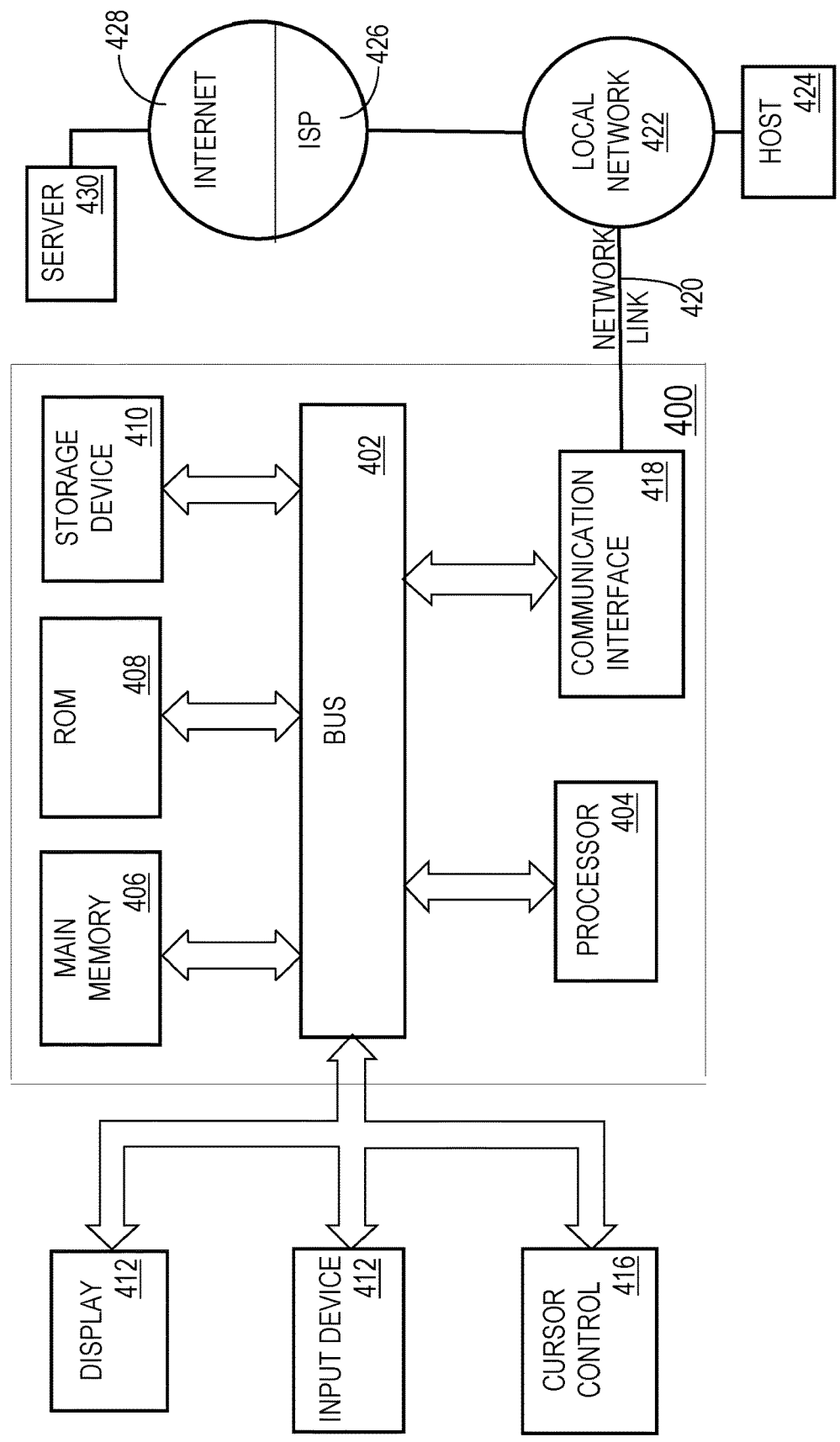
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying a plurality of tokens that are associated with online activities of an entity;
   for each token in the plurality of tokens, identifying a standardized identifier that is uniquely associated with said each token;
   wherein each standardized identifier in a plurality of standardized identifiers uniquely identifies one of the tokens in the plurality of tokens;
   identifying a plurality of machine-learned embeddings that correspond to the plurality of tokens;
   based on one or more ordering criteria that are independent of the temporal occurrence of the online activities of the entity, determining an order of the plurality of machine-learned embeddings;
   wherein determining the order is based on the values of the plurality of standardized identifiers;
   based on the order, inputting the plurality of machine-learned embeddings to a sequence encoder that generates output;
   based on the output, generating, by a machine learned model that includes the sequence encoder, a score;
   selecting a content item based on the score;
   causing the content item to be transmitted over a computer network to a computing device;
   wherein the method is performed by one or more computing devices.

2. The method of claim 1, further comprising:
   storing a plurality of training instances for training the machine-learned model;
   prior to training the machine-learned model using one or more machine learning techniques, for each training instance in the plurality of training instances:
      identifying a set of tokens that is associated with said each training instance;
      ordering the set of tokens based on the one or more ordering criteria;
      after ordering the set of tokens in said each training instance, training the machine-learned model using the one or more machine-learning techniques.

3. The method of claim 1, wherein the plurality of tokens is a first plurality of tokens, wherein the sequence encoder is a first sequence encoder for tokens of a first category, wherein the machine-learned model includes a second sequence encoder for tokens of a second category that is different than the first category, the method further comprising:
   identifying a second plurality of tokens associated with the entity;
   identifying a second plurality of machine-learned embeddings, each of which corresponds to a different token of the second plurality of tokens;
   based on the one or more ordering criteria, determining a second order of the second plurality of machine-learned embeddings;
   based on the second order, inputting the second plurality of machine-learned embeddings to a second sequence encoder that generates second output;
   wherein the score is also based on the second output.

4. The method of claim 1, wherein the plurality of tokens are a first plurality of tokens and correspond to a first category, wherein the plurality of machine-learned embeddings is a first plurality of machine-learned embeddings, wherein the order is a first order, the method further comprising:
   identifying a second plurality of tokens that is associated with the entity and that corresponds to a second category that is different than the first category;
   identifying a second plurality of machine-learned embeddings that correspond to the second plurality of tokens;
   based on the one or more ordering criteria, determining a second order of the second plurality of machine-learned embeddings;
   determining a third order of the first category and the second category;
   based on the third order, inputting the second plurality of machine-learned embeddings to the sequence encoder based on the second order after inputting the first plurality of machine-learned embeddings to the sequence encoder based on the first order.

5. The method of claim 1, wherein the plurality of tokens comprises one of: (1) names of skills; (2) names of job titles; or (3) names of organizations.

6. The method of claim 1, further comprising:
   identifying an online search history of the entity;
   identifying a plurality of records in the online search history of the entity;
   for each record in the plurality of records:
      retrieving a token based on an analysis of said each record; and
      adding the token to a set of tokens that is associated with the entity;
   wherein, after the adding, the set of tokens is the plurality of tokens.

7. The method of claim 1, wherein the sequence encoder is a transformer, the method further comprising, prior to inputting the plurality of machine-learned embeddings to the sequence encoder based on the order:
   adding, to each embedding in the plurality of machine-learned embeddings, a sequence value that indicates a position of said each embedding relative to other embeddings in the plurality of machine-learned embeddings.

8. One or more storage media storing instructions which, when executed by one or more processors, cause:
   identifying a plurality of tokens that are associated with online activities of an entity;
   for each token in the plurality of tokens, identifying a standardized identifier that is uniquely associated with said each token;
   wherein each standardized identifier in a plurality of standardized identifiers uniquely identifies one of the tokens in the plurality of tokens;
   identifying a plurality of machine-learned embeddings that correspond to the plurality of tokens;
   based on one or more ordering criteria that are independent of the temporal occurrence of the online activities of the entity, determining an order of the plurality of machine-learned embeddings;

wherein determining the order is based on the values of the plurality of standardized identifiers;

based on the order, inputting the plurality of machine-learned embeddings to a sequence encoder that generates output;

based on the output, generating, by a machine learned model that includes the sequence encoder, a score;

selecting a content item based on the score;

causing the content item to be transmitted over a computer network to a computing device.

9. The one or more storage media of claim 8, wherein the instructions, when executed by the one or more processors, further cause:

storing a plurality of training instances for training the machine-learned model;

prior to training the machine-learned model using one or more machine learning techniques, for each training instance in the plurality of training instances:
identifying a set of tokens that is associated with said each training instance;
ordering the set of tokens based on the one or more ordering criteria;
after ordering the set of tokens in said each training instance, training the machine-learned model using the one or more machine-learning techniques.

10. The one or more storage media of claim 8, wherein the plurality of tokens is a first plurality of tokens, wherein the sequence encoder is a first sequence encoder for tokens of a first category, wherein the machine-learned model includes a second sequence encoder for tokens of a second category that is different than the first category, wherein the instructions, when executed by the one or more processors, further cause:

identifying a second plurality of tokens associated with the entity;

identifying a second plurality of machine-learned embeddings, each of which corresponds to a different token of the second plurality of tokens;

based on the one or more ordering criteria, determining a second order of the second plurality of machine-learned embeddings;

based on the second order, inputting the second plurality of machine-learned embeddings to a second sequence encoder that generates second output;

wherein the score is also based on the second output.

11. The one or more storage media of claim 8, wherein the plurality of tokens are a first plurality of tokens and correspond to a first category, wherein the plurality of machine-learned embeddings is a first plurality of machine-learned embeddings, wherein the order is a first order, wherein the instructions, when executed by the one or more processors, further cause:

identifying a second plurality of tokens that is associated with the entity and that corresponds to a second category that is different than the first category;

identifying a second plurality of machine-learned embeddings that correspond to the second plurality of tokens;

based on the one or more ordering criteria, determining a second order of the second plurality of machine-learned embeddings;

determining a third order of the first category and the second category;

based on the third order, inputting the second plurality of machine-learned embeddings to the sequence encoder based on the second order after inputting the first plurality of machine-learned embeddings to the sequence encoder based on the first order.

12. The one or more storage media of claim 8, wherein the plurality of tokens comprises one of: (1) names of skills; (2) names of job titles; or (3) names of organizations.

13. The one or more storage media of claim 8, wherein the instructions, when executed by the one or more processors, further cause:

identifying an online search history of the entity;

identifying a plurality of records in the online search history of the entity;

for each record in the plurality of records:
retrieving a token based on an analysis of said each record; and
adding the token to a set of tokens that is associated with the entity;

wherein, after the adding, the set of tokens is the plurality of tokens.

14. The one or more storage media of claim 8, wherein the sequence encoder is a transformer, wherein the instructions, when executed by the one or more processors, further cause, prior to inputting the plurality of machine-learned embeddings to the sequence encoder based on the order:

adding, to each embedding in the plurality of machine-learned embeddings, a sequence value that indicates a position of said each embedding relative to other embeddings in the plurality of machine-learned embeddings.

15. A system comprising:

one or more processors;

one or more storage media storing instructions which, when executed by the one or more processors, cause:
identifying a plurality of tokens that are associated with online activities of an entity;
for each token in the plurality of tokens, identifying a standardized identifier that is uniquely associated with said each token;
wherein each standardized identifier in a plurality of standardized identifiers uniquely identifies one of the tokens in the plurality of tokens;
identifying a plurality of machine-learned embeddings that correspond to the plurality of tokens;
based on one or more ordering criteria that is independent of the temporal occurrence of the online activities of the entity, determining an order of the plurality of machine-learned embeddings;
wherein determining the order is based on the values of the plurality of standardized identifiers;
based on the order, inputting the plurality of machine-learned embeddings to a sequence encoder that generates output;
based on the output, generating, by a machine learned model that includes the sequence encoder, a score;
selecting a content item based on the score;
causing the content item to be transmitted over a computer network to a computing device.

16. The system of claim 15, wherein the instructions, when executed by the one or more processors, further cause:

storing a plurality of training instances for training the machine-learned model;

prior to training the machine-learned model using one or more machine learning techniques, for each training instance in the plurality of training instances:
identifying a set of tokens that is associated with said each training instance;
ordering the set of tokens based on the one or more ordering criteria;

after ordering the set of tokens in said each training instance, training the machine-learned model using the one or more machine-learning techniques.

17. The system of claim 15, wherein the plurality of tokens is a first plurality of tokens, wherein the sequence encoder is a first sequence encoder for tokens of a first category, wherein the machine-learned model includes a second sequence encoder for tokens of a second category that is different than the first category, wherein the instructions, when executed by the one or more processors, further cause:
- identifying a second plurality of tokens associated with the entity;
- identifying a second plurality of machine-learned embeddings, each of which corresponds to a different token of the second plurality of tokens;
- based on the one or more ordering criteria, determining a second order of the second plurality of machine-learned embeddings;
- based on the second order, inputting the second plurality of machine-learned embeddings to a second sequence encoder that generates second output;
- wherein the score is also based on the second output.

* * * * *